US012694331B2

(12) United States Patent
Wei et al.

(10) Patent No.: US 12,694,331 B2
(45) Date of Patent: Jul. 28, 2026

(54) SUFFICIENCY ASSESSMENT OF MACHINE LEARNING MODELS THROUGH MAXIMUM DEVIATION

(71) Applicant: International Business Machines Corporation, Armonk, NY (US)

(72) Inventors: Dennis Wei, Sunnyvale, CA (US); Rahul Nair, Dublin (IE); Amit Dhurandhar, Yorktown Heights, NY (US); Kush Raj Varshney, Chappaqua, NY (US); Elizabeth Daly, Dublin (IE); Moninder Singh, Farmington, CT (US); Michael Hind, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 885 days.

(21) Appl. No.: 17/931,803

(22) Filed: Sep. 13, 2022

(65) Prior Publication Data

US 2024/0095575 A1     Mar. 21, 2024

(51) Int. Cl.
*G06N 20/00* (2019.01)
*G06N 5/01* (2023.01)

(52) U.S. Cl.
CPC .............. *G06N 20/00* (2019.01); *G06N 5/01* (2023.01)

(58) Field of Classification Search
CPC ........ G06N 20/00; G06N 20/10; G06N 20/20; G06N 5/22; G06N 7/01; H04J 3/0667;
(Continued)

(56) References Cited

U.S. PATENT DOCUMENTS

| | | | | |
|---|---|---|---|---|
| 11,481,692 B2 * | 10/2022 | Sato | .......................... | G06N 5/01 |
| 11,886,955 B2 * | 1/2024 | David | .................. | G06N 3/0895 |

(Continued)

FOREIGN PATENT DOCUMENTS

| | | | | |
|---|---|---|---|---|
| AU | 2021107109 A4 | 12/2021 | | |
| CA | 3068198 A1 * | 1/2019 | ............. | G16B 30/00 |

(Continued)

OTHER PUBLICATIONS

Chen et al, "Robustness Verification of Tree-based Models," 33rd Conference on Neural Information Processing Systems (NeurIPS 2019), Vancouver, Canada (Year: 2019).*

(Continued)

*Primary Examiner* — Steven P Sax
(74) *Attorney, Agent, or Firm* — Amin, Turocy & Watson, LLP

(57) ABSTRACT

Techniques regarding determining sufficiency of one or more machine learning models are provided. For example, one or more embodiments described herein can comprise a system, which can comprise a memory that can store computer executable components. The system can also comprise a processor, operably coupled to the memory, and that can execute the computer executable components stored in memory. The computer executable components can comprise a measurement component that measures maximum deviation of a supervised learning model from a reference model over a certification set and an analysis component that determines sufficiency of the supervised learning model based at least in part on the maximum deviation.

18 Claims, 10 Drawing Sheets

(58) Field of Classification Search
CPC . G01S 5/02216; G01S 11/08; G05B 13/0265; G16H 50/20; G16B 30/00
See application file for complete search history.

(56) References Cited

U.S. PATENT DOCUMENTS

| | | | | | |
|---|---|---|---|---|---|
| 11,977,836 | B1 * | 5/2024 | Archambeau | ......... | G06F 40/279 |
| 12,061,310 | B2 * | 8/2024 | Silva | ....................... | G01W 1/10 |
| 12,199,429 | B2 * | 1/2025 | Wan | ....................... | G05B 15/02 |
| 12,242,613 | B2 * | 3/2025 | Sinn | ....................... | G06N 20/00 |
| 12,316,610 | B1 * | 5/2025 | Muth | .................. | H04L 63/0435 |
| 12,346,832 | B2 * | 7/2025 | Tater | .................... | G06F 11/3409 |
| 2015/0363838 | A1 * | 12/2015 | Wu | .................... | G06Q 30/0278 |
| | | | | | 705/306 |
| 2017/0083003 | A1 * | 3/2017 | Arisoy | .................... | G06F 30/00 |
| 2019/0156227 | A1 | 5/2019 | Duke et al. | | |
| 2021/0107109 | A1 | 4/2021 | Wang et al. | | |
| 2021/0178600 | A1 | 6/2021 | Jha et al. | | |
| 2022/0156578 | A1 * | 5/2022 | Allahdadian | .......... | G06F 17/18 |
| 2022/0207420 | A1 * | 6/2022 | Sharma | ............. | G06F 18/23213 |
| 2023/0177118 | A1 * | 6/2023 | Ba | ........................... | G06F 18/27 |
| | | | | | 706/15 |
| 2024/0152820 | A1 * | 5/2024 | Singh | .................... | H04W 24/02 |
| 2025/0069750 | A1 * | 2/2025 | Foschini | ................ | G16H 40/67 |
| 2025/0123015 | A1 * | 4/2025 | Cantrell | ................... | F24F 11/52 |

FOREIGN PATENT DOCUMENTS

| | | | | | |
|---|---|---|---|---|---|
| CA | 3091917 | A1 * | 9/2019 | ............. | G16B 40/00 |
| CA | 3128957 | A1 * | 3/2020 | ............. | G06N 7/01 |
| CA | 3119273 | A1 * | 5/2020 | ............. | G01C 21/20 |
| CA | 3140586 | A1 * | 12/2020 | ................ | F02C 9/18 |
| CA | 3207065 | A1 * | 10/2022 | .......... | G06F 9/5027 |
| CA | 3220786 | A1 * | 12/2022 | ........... | G06F 16/906 |
| CA | 3223673 | A1 * | 1/2023 | ......... | A61B 5/14542 |
| CA | 2894317 | C * | 8/2023 | .............. | C12Q 1/68 |
| CN | 109617122 | A | 4/2019 | | |
| CN | 110070131 | A | 7/2019 | | |
| CN | 106919769 | B * | 4/2020 | .......... | G06F 30/392 |
| CN | 111666631 | A | 9/2020 | | |
| CN | 112733270 | A | 4/2021 | | |
| CN | 108599154 | B * | 5/2021 | ................ | H02J 3/00 |
| CN | 114019909 | A | 2/2022 | | |
| CN | 114357882 | A * | 4/2022 | ....... | G06F 16/90335 |
| CN | 112600921 | B * | 5/2022 | ............. | H04W 4/70 |
| CN | 114583746 | A | 6/2022 | | |
| CN | 115210771 | A * | 10/2022 | ............. | G06V 20/30 |
| CN | 115485696 | A * | 12/2022 | ............. | G06N 3/084 |
| CN | 115529278 | A * | 12/2022 | ............. | H04L 41/16 |
| CN | 109741797 | B * | 1/2023 | | |
| FR | 2908657 | A1 * | 5/2008 | .............. | A61P 25/14 |
| SG | 10201913208 | | * 2/2020 | | |
| WO | WO-2008008919 | A2 * | 1/2008 | ............. | G16B 20/20 |
| WO | WO-2022155292 | A1 * | 7/2022 | ............. | G16H 50/20 |
| WO | WO-2022171788 | A1 * | 8/2022 | ......... | G05B 13/0265 |
| WO | WO-2023191787 | A1 * | 10/2023 | ............. | G06F 11/079 |

OTHER PUBLICATIONS

Amodei, D. et al. | "Concrete problems in AI safety". arXiv:1606. 06565v2 [cs.AI] Jul. 25, 2016, 29 pages.

Huang, X. et al. | "A survey of safety and trustworthiness of deep neural networks: Verification, testing, adversarial attack and defence, and interpretability". arXiv:1812.08342v5 [cs.LG] May 31, 2020, 95 pages.

Inala, J. P et al. | "Synthesizing programmatic policies that inductively generalize". In International Conference on Learning Representations, 2020. URL https://openreview.net/forum?id= S1I8oANFDH, last accessed Aug. 25, 2022, 21 pages.

Raghunathan, A. et al. | "Certified defenses against adversarial examples". arXiv:1801.09344v2 [cs.LG] Oct. 31, 2020, 15 pages.

Rupprecht, Ch. et al. | "Finding and visualizing weaknesses of deep reinforcement learning agents". In International Conference on Learning Representations, 2020. URL https://openreview.net/forum? id=rylvYaNYDH, last accessed Aug. 25, 2022, 22 pages.

Wong, E. et al. | "Provable defenses against adversarial examples via the convex outer adversarial polytope". In International Conference on Machine Learning, pp. 5286-5295. PMLR, 2018, 10 pages.

Zhu, H. et al. | "An inductive synthesis framework for verifiable reinforcement learning." In Proceedings of the 40th ACM SIGPLAN Conference on Programming Language Design and Implementation, pp. 686-701, Phoenix, AZ, USA, 2019, 16 pages.

Anonymous | "On the Safety of Interpretable Machine Learning: A Maximum Deviation Approach". Submitted to 36th Conference on Neural Information Processing Systems (NeurIPS 2022), 47 pages.

* cited by examiner

600

MEASURING, BY A SYSTEM, MAXIMUM DEVIATION OF A SUPERVISED LEARNING MODEL FROM A REFERENCE MODEL OVER A CERTIFICATION SET

602

DETERMINING, BY THE SYSTEM, SUFFICIENCY OF THE SUPERVISED LEARNING MODEL BASED AT LEAST IN PART ON THE MAXIMUM DEVIATION

604

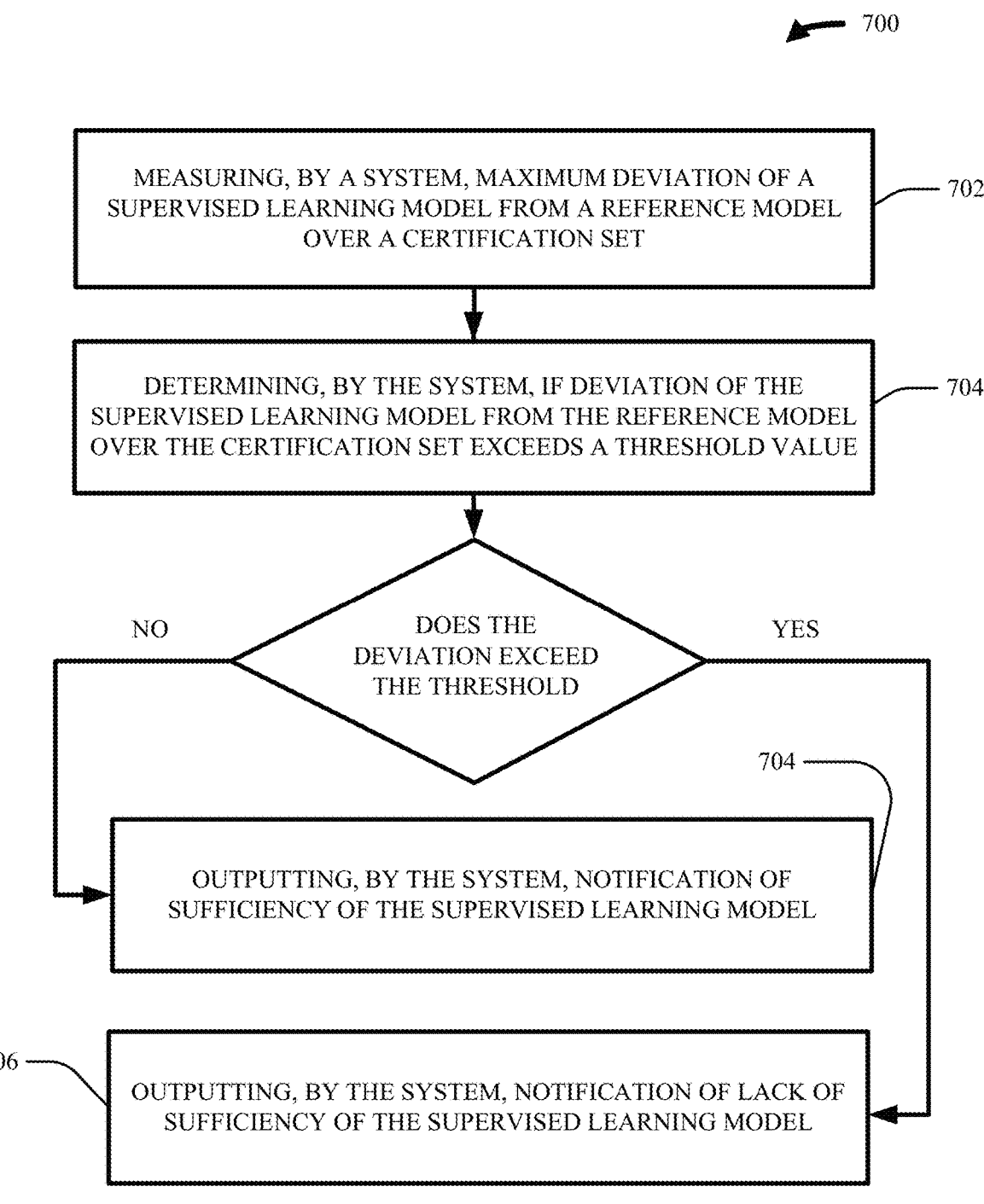

700

MEASURING, BY A SYSTEM, MAXIMUM DEVIATION OF A SUPERVISED LEARNING MODEL FROM A REFERENCE MODEL OVER A CERTIFICATION SET — 702

DETERMINING, BY THE SYSTEM, IF DEVIATION OF THE SUPERVISED LEARNING MODEL FROM THE REFERENCE MODEL OVER THE CERTIFICATION SET EXCEEDS A THRESHOLD VALUE — 704

NO          DOES THE DEVIATION EXCEED THE THRESHOLD          YES

704 —

OUTPUTTING, BY THE SYSTEM, NOTIFICATION OF SUFFICIENCY OF THE SUPERVISED LEARNING MODEL

706 —

OUTPUTTING, BY THE SYSTEM, NOTIFICATION OF LACK OF SUFFICIENCY OF THE SUPERVISED LEARNING MODEL

FIG. 7

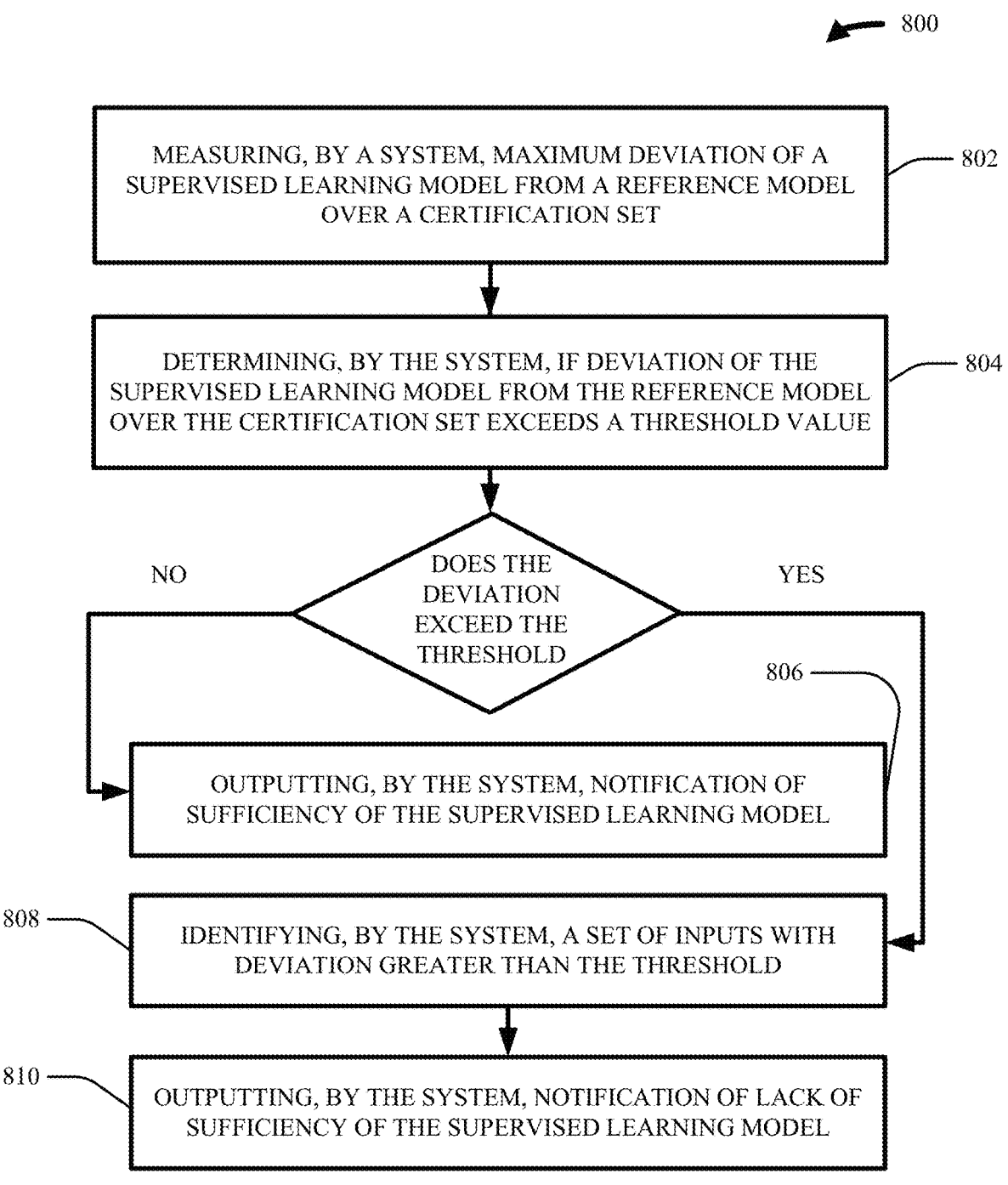

— 800

MEASURING, BY A SYSTEM, MAXIMUM DEVIATION OF A SUPERVISED LEARNING MODEL FROM A REFERENCE MODEL OVER A CERTIFICATION SET — 802

DETERMINING, BY THE SYSTEM, IF DEVIATION OF THE SUPERVISED LEARNING MODEL FROM THE REFERENCE MODEL OVER THE CERTIFICATION SET EXCEEDS A THRESHOLD VALUE — 804

NO

DOES THE DEVIATION EXCEED THE THRESHOLD

YES

806 —

OUTPUTTING, BY THE SYSTEM, NOTIFICATION OF SUFFICIENCY OF THE SUPERVISED LEARNING MODEL

808 — IDENTIFYING, BY THE SYSTEM, A SET OF INPUTS WITH DEVIATION GREATER THAN THE THRESHOLD

810 — OUTPUTTING, BY THE SYSTEM, NOTIFICATION OF LACK OF SUFFICIENCY OF THE SUPERVISED LEARNING MODEL

FIG. 8

900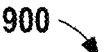

CLIENT COMPUTER  901

PROCESSOR SET 910

| PROCESSING CIRCUITRY 920 | CACHE 921 |

COMMUNICATION FABRIC 911

VOLATILE MEMORY 912

PERSISTENT STORAGE 913

OPERATING SYSTEM 922

MACHINE LEARNING
SUFFICIENCY CODE

950

PERIPHERAL DEVICE SET 914

| UI DEVICE SET 923 | STORAGE 924 | IoT SENSOR SET 925 |

NETWORK MODULE 915

WAN 902

END USER DEVICE 903

REMOTE SERVER 904

REMOTE DATABASE 930

PRIVATE CLOUD 906

GATEWAY 940

PUBLIC CLOUD 905

| CLOUD ORCHESTRATION MODULE 941 | HOT PHYSICAL MACHINE SET 942 |
| VIRTUAL MACHINE SET 943 | CONTAINER SET 944 |

FIG. 9

SUFFICIENCY ASSESSMENT OF MACHINE LEARNING MODELS THROUGH MAXIMUM DEVIATION

BACKGROUND

The subject disclosure relates to assessing performance of artificial intelligence ("AI") models, and more specifically, to determining sufficient performance of AI models based on maximum deviation from a reference model over a certification set.

AI systems are already working alongside humans as trusted advisors in high-stakes decision-making applications such as mortgage lending and/or employment practices. However, AI systems can produce unexpected or unintended results and therefore assessing the sufficiency of performance of AI systems can be difficult due to the large number of possible inputs to AI systems. Accordingly, in these domains, sufficiency of respective models or accuracy is significant.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can assess sufficiency of machine learning models are described.

According to an embodiment, a system is provided. The system can comprise a memory that can store computer executable components. The system can also comprise a processor, operably coupled to the memory, and that can execute the computer executable components stored in the memory. The computer executable components can comprise a measurement component that measures maximum deviations of a supervised learning model from a reference model over a certification set and an analysis component that can determine sufficiency of the supervised learning model based at least in part on the maximum deviation. An advantage of such a system can be that the deployment of machine learning models that may generate unexpected outputs can be prevented.

In some examples of the above described system, the analysis component can further identify inputs that lead to substantial deviations. An advantage of such a system is that inputs that are likely to result in unexpected outputs can be identified.

According to an embodiment, a computer-implemented method is provided. The computer-implemented method can comprise measuring, by a processor, maximum deviation of a supervised learning model from a reference model over a certification set and determining sufficiency of the supervised learning model based at least in part on the maximum deviation. An advantage of such a computer-implemented method can be that the deployment of machine learning models that may generate unexpected outputs can be prevented.

In some examples, the computer-implemented method can further comprise identifying, by the processor, inputs that lead to deviation greater than a threshold. An advantage of such a computer implemented method is that inputs that are likely to result in unexpected outputs can be identified.

According to an embodiment, a computer program product is provided. The computer program product can comprise a computer readable storage medium having program instructions embodied therewith. The program instructions can be executable by a processor to cause the processor to measure maximum deviation of a supervised learning model from a reference model over a certification set and determine sufficiency of the supervised learning model based at least in part on the maximum deviation.

BRIEF DESCRIPTION OF THE DRAWINGS

FIG. 7 illustrates a flow diagram of an example, non-limiting computer-implemented method that can facilitate assessment of the sufficiency of one or more machine learning models in accordance with one or more embodiments described herein.

FIG. 8 illustrates a flow diagram of an example, non-limiting computer-implemented method that can facilitate assessment of the sufficiency of one or more machine learning models in accordance with one or more embodiments described herein.

FIG. 9 illustrates a block diagram of an example, computing environment in which one or more embodiments described herein can be facilitated.

Figure 1:
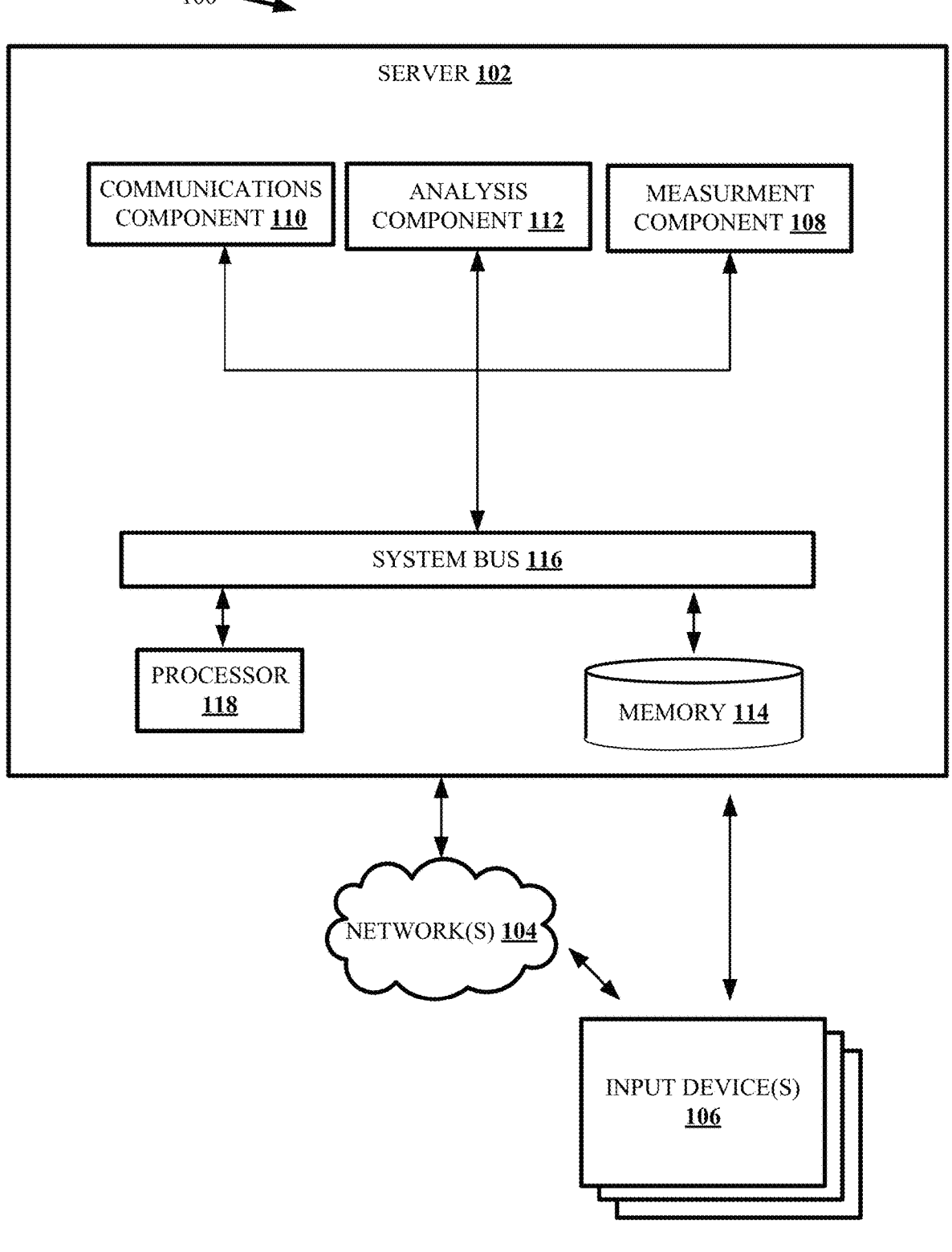
FIG. 1 illustrates a block diagram of an example, non-limiting system that can assess the sufficiency of one or more machine learning models in accordance with one or more embodiments described herein.

Appendix A is a detailed paper describing various embodiments and is to be considered part of this patent specification.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used herein, the term "safety" does not refer to safety with respect towards personal injury, but with respect towards expected output of a machine learning model.

As referenced herein, an "entity" can comprise a client, a user, a computing device, a software application, an agent, a machine learning (ML) model, an artificial intelligence (AI) model, and/or another entity.

Supervised learning models can operate by receiving an input value from within an input space and mapping the input value to an output value within an output space. However, supervised learning models can often generate unexpected outputs when the input value is not within or close to (e.g., within a deviation of) a training set used to train the supervised learning model. For example, given an input value that is outside of the training set, supervised learning models may generate unexpected or incorrect outputs due to the insufficiency of the training of the supervised learning models.

Given the problems with identifying sufficiency of machine learning models, the present disclosure can be implemented to produce a solution to one or more of these problems by measuring a maximum deviation of a machine learning model from a reference model over a certification set, and determining sufficiency of the machine learning model based at least in part on the maximum deviation. Advantageously, one or more embodiments described herein can enable determination of sufficiency based on different degrees of accuracy. For example, the maximum deviation can be compared to differing sufficiency threshold values to determine different levels of sufficiency.

Various embodiments of the present invention can be directed to computer processing systems, computer-implemented methods, apparatus and/or computer program products that facilitate the determination of sufficiency of one or more machine learning models. For example, one or more embodiments described herein can measure maximum deviation of a machine learning model from a reference model over a certification set. Further, one or more embodiments can determine sufficiency of a machine learning model based at least in part on the maximum deviation. Additionally, various embodiments can identify inputs that lead to deviation above a threshold value. Thereby, one or more embodiments can determine sufficiency of a machine learning model and/or identify inputs on which performance of the machine learning model is not sufficient.

In an embodiment, the certification set can comprise a subset of an input space and the reference model can comprise a machine learning model that was previously extensively trained and/or previously deployed and known to perform within specific parameters. Accordingly, the supervised learning model and the reference model can receive the same input values from the certification set and map the input values to output values. A maximum deviation between the output values generated by the supervised learning model and the output values generated by the reference model can then be determined using a deviation function, as described in greater detail below in reference to FIG. 1. By determining deviations between outputs of the supervised learning model and the reference model, a direct comparison between the performance of the supervised learning model and the reference model can be made. For example, as the reference model can comprise a previously well trained, well understood, or deployed model, the maximum deviation enables a direct comparison between the performance of the supervised learning model and the "expected" outputs (e.g., the outputs of the reference model).

To account for various degrees of accuracy and/or sufficiency, the maximum deviation can be compared to a threshold value. For example, if the maximum deviation is less than or equal to the threshold value, then the performance of the supervised learning model is within an acceptable degree of accuracy (e.g., sufficient performance) from the reference model. If the maximum deviation is greater than the threshold value, then the performance of the supervised learning model in not within an acceptable degree of accuracy (e.g., sufficient performance) from the reference model.

In various embodiments, multiple certification sets and multiple threshold values can be utilized to assess sufficiency of the supervised learning model. For example, as described in greater detail below in reference to FIG. 1, a first maximum deviation of the supervised learning model from the reference model over a first certification set can be measured and a second maximum deviation of the supervised learning model from the reference model over a second certification set can be measured. The first maximum deviation and the second maximum deviation can be compared to the threshold value as described above. In an embodiment, the performance of the supervised learning model can be sufficient if both the first maximum deviation and the second maximum deviation are less than or equal to the threshold value. In another embodiment, the performance of the supervised learning model can be sufficient if one of the first maximum deviation and the second maximum deviation is less than or equal to the threshold value.

In a further embodiment, the multiple maximum deviations can be compared to multiple corresponding threshold values. For example, the first maximum deviation can be compared to a first threshold value and the second maximum deviation can be compared to a second threshold value. Accordingly, the determination of the sufficiency of the performance of the supervised learning model can be tailored to allow for different degrees of accuracy based on different certification sets, thereby allowing for greater granularity in determining whether the supervised learning model's performance is sufficient.

In another embodiment, a set of inputs that lead to deviation greater than the threshold value can be identified. For example, deviations between the outputs of the supervised learning model and the reference model for each input in the certification set can be measured using the deviation function. The deviations can then be compared to the threshold value, and inputs with corresponding deviations greater than the threshold value can be added to a list. In various embodiments, the list of inputs can be output to an entity and/or utilized as a new training set to improve performance of the supervised learning model.

FIG. 1 illustrates a block diagram of an example, non-limiting system 100 that can assess the performance one or more machine learning models. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines, (e.g., computers, computing devices, virtual machines, etc.) can cause the machines to perform the operations described.

As illustrated in FIG. 1, the system 100 can comprise one or more servers 102, one or more networks 104 and/or input devices 106. The server 102 can comprise measurement component 108. The server 102 can further comprise analysis component 112 and/or communications component 110. Also, the server 102 can comprise or otherwise be associated with at least one memory 114. The server 102 can further comprise a system bus 116 that can couple to various components such as, but not limited to, the measurement component 108, analysis component 112, communications component 110, memory 114 and/or a processor 118. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the measurement component 108 and/or analysis component 112 can be provided on the one or more servers 102, it should be appreciated that the architecture of system 100 is not so limited. For example, the measurement component 108, analysis component 112, and/or one or more other components can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter data (e.g., preferences regarding one or more machine learning models, input spaces, output spaces and/or certification sets) into the system 100, thereby sharing (e.g., via a direct connection and/or via the one or more networks 104) said data with the server 102. For example, the one or more input devices 106 can send data to the communications component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In one or more embodiments, measurement component 108 can measure maximum deviation of a supervised learning model from a reference model over a certification set. For example, measurement component 108 can sample outputs from the supervised learning model and the reference model based on inputs within a certification set. Measurement component 108 can then measure deviation between the outputs of the supervised learning model and outputs of the reference model using a deviation function. In a further embodiment, measurement component 108 can output a list comprising inputs and the deviations produced by the inputs. For example, measurement component 108 can measure the deviation for all inputs within the certification set and output a list comprising the measured deviations and the corresponding inputs. In an embodiment, the supervised learning model can be a machine learning model that an entity wants to determine sufficiency of. As used herein sufficiency can refer to a level of acceptable performance of a machine learning model. For example, some supervised machine learning models may produce grossly unexpected outputs, corresponding to inputs that are poorly represented (e.g., not represented or not fully represented) in the training data used to train the supervised learning model.

In an embodiment, the supervised learning model $f$ can comprise a function that maps an input feature space $\mathcal{X}$ to an output space $\mathcal{Y}$. To assess sufficiency of the supervised learning model, a maximum deviation (e.g., worst-case deviation) from a reference model $f_0 \colon \mathcal{X} \mapsto \mathcal{Y}$ can be determined by measurement component 108. The maximum deviation can be defined as $$\max_{x \in C} D(f(x), f_0(x)) \tag{1}$$

wherein D: $\mathcal{Y} \times \mathcal{Y} \mapsto \mathbb{R}_+$ is a measure of deviation, wherein $\mathbb{R}_+$ is the set of non-negative reals, and wherein $C \subseteq \mathcal{X}$ is a certification set over which the deviation is maximized. In some embodiment, a large deviation value may not be indicative of a sufficiency risk, as the supervised learning model and the reference model may differ for valid reasons. For example, one model may capture a useful pattern that the other does not. A large deviation can indicate a sufficient reason to further investigate. Accordingly, measurement component 108 can utilize sample outputs from the reference model and the supervised learning model, using the certification set as inputs, and measure the deviation between the outputs of the reference model and the supervised learning model. By measuring the deviation between the outputs of the reference model and the supervised learning model, measurement component 108 can enable direct comparison of the performance of the supervised learning model to the reference model. For example, the larger the deviation, the larger the difference between the outputs (e.g., performance of) the supervised learning model and the reference model.

In the case of regression, $\mathcal{Y}$ can be defined as the set of reals $\mathbb{R}$ or an interval thereof. In the case of binary classification, while $\mathcal{Y}$ could be defined as $\{0,1\}$ or $\{-1, +1\}$, these limit the possible deviations to binary values as well (e.g., "same" or "different"). Accordingly, $\mathcal{Y}$ can be defined as the space of real-valued scores that are thresholded to produce a binary label. For example, y can be a predicted probability in $[0,1]$ or a log-odds ratio in $\mathbb{R}$. Similarly for multi-class classification with M classes, $\mathcal{Y} \subset \mathbb{R}^M$ can be a M-dimensional space of real-valued scores.

In an embodiment, the reference model, $f_0$, can perform sufficiently. The simplest case mathematically is for $f_0$ to be a constant function representing a baseline value, for example zero. More generally, $f_0$ can be a simple model (e.g., a linear model with 10 non-zero coefficients or a decision tree with 10 leaves) that can be readily grasped by an entity, may be validated against domain knowledge, or may be based on a small number of expert-selected features. In some embodiments, the reference model can be an existing model that has been extensively tested and deployed. In this case, the supervised learning model can be a new version of the reference model, trained on more recent data or improved in some fashion. In this and more complex settings, the reference model may not be globally interpretable, but may be so in local regions.

In an embodiment, the certification set, $\mathcal{C}$, can comprise all inputs that the supervised learning model might conceivably be exposed to. For example, the certification set may comprise inputs that are statistically improbable or unlikely but not physically or logically impossible. Accordingly, while the certification set can be based on a support set of a probability distribution or data sample, the certification set does not depend on the likelihood of points within the support set. In some embodiments, the certification set can comprise a strict superset of the training data domain. For example, the supervised learning model may have been trained on data for objects with a first attribute and the certification set can comprise data representing the objects with a second attribute. For tabular, or lower-dimensional data, the certification set can comprise the entire input space. For non-tabular or higher-dimensional data, given a data set $$\{x_i\}_{i=1}^n$$

and a union of $\ell_p$ balls centered at $x_i$, the certification set can be defined as $$C = \bigcup_{i=1}^n \mathcal{B}_r^p[x_i], \; \mathcal{B}_r^p[x_i] = \{x \in \mathcal{X} : \|x - x_i\|_p \le r\}. \quad (2)$$

In this example, the certification set comprises points somewhat close to the n observed examples $x_i$. In some embodiments, multiple certification sets, or subsets of the certification set can be used by measurement component 108 to measure the maximum deviation.

In an embodiment, measurement component 108 can measure maximum deviation for different classes of model. For example, the reference model and the supervised learning model can both comprise decision trees. A decision tree with L leaves partitions the input space $\mathcal{X}$ into L corresponding parts, which are referred to as leaves. In the case of non-oblique trees, each leaf is described by a conjunction of conditions on individual features and is therefore a Cartesian product. With $\mathcal{L}_l \subset \mathcal{X}$ denoting the lth leaf and $y_l \in \mathcal{Y}$ the output value assigned to it, tree $f$ (e.g., the supervised learning model) is described by the function $$f(x) = y_l \;\; \text{if} \;\; x \in \mathcal{L}_l, \; l = 1, \dots, L, \quad (3)$$

and similarly, for $f_0$ (e.g., the reference model) with leaves $\mathcal{L}_{0m}$ and outputs $y_{0m}$, m=1, . . . , $L_0$. The partitioning of $\mathcal{X}$ by decision trees and their piecewise-constant nature simplify the computation of the maximum deviation. Specifically, the maximization can be restricted to pairs of leaves (l,m) for which the intersection $\mathcal{L}_l \cap \mathcal{L}_{0m} \cap \mathcal{C}$ is non-empty. The intersection of two leaves $\mathcal{L}_l \cap \mathcal{L}_{0m}$ is another Cartesian product, assumed to be tractable to determine whether $\mathcal{C}$ intersects a given Cartesian product.

In an embodiment, measurement component 108 can define a bipartite graph with L nodes representing the leaves $\mathcal{L}_l$ of $f$ on one side and $L_0$ nodes representing the leaves $\mathcal{L}_{0m}$ of $f_0$ on the other and an edge set as $\mathcal{E} = \{(l,m) : \mathcal{L}_l \cap \mathcal{L}_{0m} \cap \mathcal{C} \neq \emptyset\}$, wherein $|\mathcal{E}| \le L_0 L$, where $f$ and $f_0$ are decision trees with L and $L_0$ leaves. $\mathcal{E}$ is a bipartite edge set of leaf intersections, and measurement component 108 can measure the maximum deviation as $$\max_{x \in C} D(f(x), f_0(x)) = \max_{(l,m) \in \mathcal{E}} D(y_l, y_{0m}). \quad (4)$$

The complexity of deviation maximization for decision trees can then be summarized as follows. Proposition 1: Let $f$ and $f_0$ be decision trees as in Eq. (3) with L and $L_0$ leaves respectively, and $\mathcal{E}$ be the bipartite edge set of leaf intersections defined above. Then the maximum deviation Eq. (1) can be computed with $|\mathcal{E}|$ evaluations as shown in Eq. (4).

In an embodiment, the supervised learning model can comprise a generalized additive model (GAM), defined as $$f(x) = g^{-1}\left(\sum_{j=1}^d f_j(x_j)\right), \quad (5)$$

where each $f_j$ is an arbitrary function of feature $x_j$. In the case where $f_j(x_j) = w_j x_j$ for all continuous features $x_j$, where $w_j$ is a real coefficient, Eq. (5) is a generalized linear model (GLM). Accordingly, invertible link function $g: \mathbb{R} \to \mathbb{R}$ is furthermore assumed to be monotonically increasing. This assumption is satisfied by common GAM link functions: identity, logit ($g(y) = \log(y/(1-y))$), and logarithmic. Equation (5) therefore implies that $\mathcal{Y} \subset \mathbb{R}$ and the deviation $D(y, y_0)$ is a function of two scalars y and $y_0$. For this scalar case, the following assumption can be made. Assumption 1: For y, $y_0 \in \mathcal{Y} \subseteq \mathbb{R}$, 1) $D(y, y_0) = 0$ whenever $y = y_0$; 2) $D(y, y_0)$ is monotonically non-decreasing in y for $y \ge y_0$ and non-increasing in y for $y \le y_0$. Therefore, the additive form of equation 5 can be exploited by reducing equation 1 to the optimization $$\max_{x \in S} \sum_{j=1}^d f_j(x_j), \quad (6)$$

for different choices of $S \subset \mathcal{X}$ and where minimization is obtained by negating all $f_j$. This can be done for two types of reference model $f_0$: decision tree (which includes the constant case $L_0=1$) and additive. Proposition 2: Let $f$ be a GAM as in Eq. (5) and $\mathcal{S}$ be a subset of $\mathcal{X}$ where $f_0(x) \equiv y_0$ is constant. Then if Assumption 1 holds, $$\max_{x \in S} D(f(x), f_0(x)) =$$

$$\max\left\{ D\left(g^{-1}\left(\max_{x \in S}\sum_{j=1}^{d} f_j(x_j)\right), y_0\right), D\left(g^{-1}\left(\min_{x \in S}\sum_{j=1}^{d} f_j(x_j)\right), y_0\right)\right\}.$$

If $f_0$ is tree-structured, then $f_0$ is piecewise constant over its leaves $\mathcal{L}_{0m}$, $m=1, \ldots, L_0$, take $\mathcal{S}$ to be the intersection of $\mathcal{C}$ with each $\mathcal{L}_{0m}$ in turn and apply Proposition 2. The overall maximum is then obtained as the maximum over the leaves, $$\max_{x \in C} D(f(x), f_0(x)) = \max_{m=1,\ldots,L_0} \max\left\{ D\left(g^{-1}\left(\max_{x \in \mathcal{L}_{0m} \cap C}\sum_{j=1}^{d} f_j(x_j)\right), y_{0m}\right), \quad (7)\right.$$

$$\left. D\left(g^{-1}\left(\min_{x \in \mathcal{L}_{0m} \cap C}\sum_{j=1}^{d} f_j(x_j)\right), y_{0m}\right)\right\}.$$

This reduces Eq. (1) to solving $2L_0$ instances of Eq. (6).

If $f_0$ is additive, the additional assumption can be made that the link function g in Eq. (5) is the identity function, as well as Assumption 2. Assumption 2: $D(y,y_0)=D(y-y_0)$ is a function only of the difference $y-y_0$. Then $$f_0(x) = \sum_{j=1}^{d} f_{0j}(x_j)$$

and the difference $f(x)-f_0(x)$ is also additive. Using Assumption 1, Assumption 2 and a similar argument as in the proof of Proposition 2, the maximum deviation is again obtained by maximizing and minimizing an additive function, resulting in two instances of Eq. (6) with $\mathcal{S}=\mathcal{C}$:

$$\max_{x \in C} D(f(x), f_0(x)) = \max\left\{ D\left(\max_{x \in C}\sum_{j=1}^{d} f_j(x_j) - f_{0j}(x_j)\right),\right.$$

$$\left. D\left(\min_{x \in C}\sum_{j=1}^{d} f_j(x_j) - f_{0j}(x_j)\right)\right\}.$$

If $f$ is a nonlinear additive, it can be additionally assumed that $\mathcal{C}$ is a Cartesian product. It follows that $$S = \prod_{j=1}^{d} S_j$$

is a Cartesian product and Eq. (6) separates into one-dimensional optimizations over $\mathcal{S}_j$, $$\max_{x \in S}\sum_{j=1}^{d} f_j(x_j) = \sum_{j=1}^{d} \max_{x_j \in \mathcal{S}_j} f_j(x_j). \quad (8)$$

The computational complexity of Eq. (8) is thus $$\sum_{j=1}^{d} C_j,$$

where $C_j$ is the complexity of the jth one-dimensional optimization, and the overall complexity is linear in d. In the GLM case where $$\sum_{j=1}^{d} f_j(x_j) = w^T x,$$

Eq. (6) is simpler, and it is less important that $\mathcal{C}$ be a Cartesian product. In particular, if $\mathcal{C}$ is a convex set, so too is $\mathcal{S}$. Hence Eq. (6) is a convex optimization problem.

In an embodiment, the supervised learning model can comprise a tree ensemble. The class of tree ensembles comprises model types such as Random Forests and Gradient Boosted Trees, as well as rule ensembles, as a special case. For example, $f$ can comprise a tree ensemble comprising K trees and $f_0$ can comprise a single decision tree. $\mathcal{L}_{l_k}$ can denote the lth leaf of the kth tree in $f$ for $l=1, L_k$, and $\mathcal{L}_{0m}$ can be the mth leaf of $f_0$, for $m=1, L_0$. Correspondingly, $y_{l_k}$ and $y_{0m}$ can denote the prediction values associated with each leaf. A graph, $\mathcal{G}(\mathcal{V}, \mathcal{E})$, can be defined where there is a vertex for each leaf in $f$ and $f_0$, and wherein $$\mathcal{V} = \{l_k | \forall\ k = 1, \ldots, K, l = 1, , L_k\} \cup \{m | m = 1, , L_0\}. \quad (9)$$

An edge for each overlapping pair of leaves in V can be constructed, such that $$\mathcal{E} = \{(i, j) | \mathcal{L}_i \cap \mathcal{L}_j \neq \emptyset, \forall\ (i, j) \in V, i \neq j\}. \quad (10)$$

This graph is a K+1-partite graph, as leaves within an individual tree do not intersect and are an independent set. M can be denoted as the adjacency matrix of $\mathcal{G}$. Therefore, a maximum clique S of size K+1 on such a graph provides a discrete region in the feature space with a computable deviation. A clique is a subset of nodes all connected to each other; a maximum clique is one that cannot be expanded further by adding a node. The model predictions $y_c$ and $y_{0c}$ can be ensembled from leaves in S. D(S) can be denoted as the deviation computed from the clique S. Measurement component 108 can then maximize over all such cliques to solve Eq. (1). However, complete enumeration is computationally expensive, so in an embodiment, measurement component 108 can use a merge procedure of a heuristic function to reduce computational cost.

For example, a heuristic function which exploits the K+1-partite structure of $\mathcal{G}$ can be used. Specifically, at each step of the enumeration procedure, an intermediate clique S contains selected leaves from trees in [1,k] and unexplored trees in [k+1,K+1]. For each unexplored tree, measurement component 108 can select a valid candidate leaf that maximizes deviation such that $$v_k = \text{argmax}_{l_k, l_k \cap \emptyset, \forall i \in S}\, d(S \cup l_k). \quad (11)$$

Using these worst-case leaves, a heuristic function $$H(S) = D(S') = D\left(S \cup_{m=k+1}^{K+1} v_m\right) \qquad (12)$$

provides an upper (dual) bound. In practice, this dual bound is tight and therefore very useful during the search procedure to prune the search space. Each K+1 clique provides a primal bound, so the search can be terminated early before examining all trees if the dual bound is less than the primal bound. Starting with an empty clique, the pruning procedure adds a single node from each tree to create an intermediate clique. If the size of the clique is K+1, the primal bound is updated. Otherwise, the dual bound is computed. A node compatibility vector is used to keep track of all feasible additions. When the search is terminated at any step, the maximum deviation is bounded by $(D_{lb}, D_{ub})$. This algorithm works for the entire feature space. When the certification set $\mathcal{C}$ is a union of balls as in Eq. (2), some additional considerations are called for. First, leaves that do not intersect with $\mathcal{C}$ can be discarded during the graph construction phase. Additionally, a validation step can be utilized to ensure that the leaves of a clique all intersect with the ball in $\mathcal{C}$.

In some embodiments, the supervised learning function and/or the reference function can comprise classes of functions that can be randomized with finite variance. For example, $f$ and $f_0$ can denote the mean values of the learned and reference functions respectively. In the case where each function is either interpretable or black box, the latter implies that query access is the only realistic way of probing the model. This leads to three cases where either both functions are black box or interpretable, or one is black box. In these cases, measurement component 108 can find the maximum (and minimum) of a function $\Delta(x)=f(x)-f_0(x)$. Given that $f$ and $f_0$ can be random functions $\Delta$ is also a random function and if $\Delta$ is black box a standard way to optimize it is either using Bayesian Optimization (BO) or tree search type bandit methods. To achieve this, the following relevant terms are defined.

Definition 1 (Simple Regret): If $$f_{\mathcal{C}}^*$$

denotes the optimal value of the function $f$ on the certification set $\mathcal{C}$, then the simple regret $$r_q^{\mathcal{C}}$$

after querying the $f$ function q times and obtaining a solution $x_q$ is given by, $$r_q^{\mathcal{C}}(f) = f_{\mathcal{C}}^* - f(x_q).$$

Definition 2 (Order $\beta$ c-Lipschitz): Given a (normalized) metric $\ell$ a function $f$ is c-Lipschitz continuous of order $\beta>0$ if for any two inputs x, y and for c>0, $|f(x)-f(y)| \leq c \cdot \ell(x,y)^\beta$.

Definition 3 (Near optimality dimension): If $\mathcal{N}(\mathcal{C}, \ell, \epsilon)$ is the maximum number of $\epsilon$ radius balls one can fit in $\mathcal{C}$ given the metric $\ell$ and $$C_\epsilon = \{x \in C | f(x) \geq f_{\mathcal{C}}^* - \epsilon\},$$

then for c>0 the c-near optimality dimension is given by, $$v = \max\left(limsup_{\epsilon \to 0} \frac{\ln \mathcal{N}(C_{c\epsilon}, \ell, \epsilon)}{\ln(\epsilon^{-1})}, 0\right).$$

Intuitively, simple regret measures the deviation between the current best and the optimal solution. The Lipschitz condition bounds the rate of change of the function. Near optimality dimension measures the set size for which the function has close to optimal values. The lower the value v, the easier it is to find the optimum. What it means to have an interpretable function can now be defined.

Assumption 3 (Characterizing an Interpretable Function): If a function $f$ is interpretable, then measurement component 108 can find $1 \leq m \ll n$ partitions $\{\mathcal{C}^{(1)}, \ldots, \mathcal{C}^{(m)}\}$ of the certification set $\mathcal{C}$ such that the function $f^{(i)}=\{f(x)|x \in \mathcal{C}^{(i)}\}$ $\forall i \in \{1, \ldots, m\}$ in each partition is c-Lipschitz of order $\beta$. This assumption is motivated by observing different interpretable functions. For example, in the case of decision trees, the m partitions could be its leaves, where typically the function is a constant in each leaf (c=0). For rule lists as well, a fixed prediction is usually made by each rule. For a linear function one could consider the entire input space (e.g., m=1), where for a bounded slope $\alpha$, the function would also satisfy the assumption (c=$\alpha$ and $\beta$=1). Examples of models that are not piecewise constant or globally Lipschitz are oblique decision trees, regression trees with linear functions in the leaves, and functional trees. Moreover, m is likely to be small so that the overall model is interpretable (e.g., can be described visually with shallow trees and/or small rules). With the above definitions and Assumption 3, the simple regret for the function can be provided $\Delta$ for the three cases.

If both $f$ and $f_0$ are black box, then it seems no gains could be made in estimating the maximum of $\Delta$ over standard results in bandit literature. Hence, using Hierarchical Optimistic Optimization (HOO) with assumptions such as $\mathcal{C}$ being compact and $\Delta$ being weakly Lipschitz with near optimality dimension v the simple regret after q queries is:

$$r_q^{\mathcal{C}}(\Delta) \leq O\left(\left(\frac{\ln(q)}{q}\right)^{\frac{1}{v+2}}\right) \qquad (13)$$

If both $f$ and $f_0$ are interpretable, then for each function based on Assumption 3 measurement component 108 can find $m_1$ and $m_0$ partitions of $\mathcal{C}$ respectively where the functions are $c_1$ and $c_0$-Lipschitz of order $\beta_1$ and $\beta_0$ respectively. Taking non-empty intersections of these partitions where there is a maximum of $m_1 m_0$ partitions, the function $\Delta$ in these partitions would be c=2 max($c_0,c_1$)-Lipschitz of order $\beta$=min($\beta_0,\beta_1$) as stated below.

Proposition 3: If functions $h_0$ and $h_1$ are $c_0$ and $c_1$ Lipschitz of order $\beta_0$ and $\beta_1$ respectively, then the function $h=h_0-h_1$ is c-Lipschitz of order $\beta$, where c=2 max($c_0,c_1$) and $\beta$=min($\beta_0,\beta_1$).

Given that $\Delta$ is smooth in these partitions with underestimated smoothness of order $\beta$, the simple regret after $q_i$ queries in the $i^{th}$ partition $\mathcal{C}^{(i)}$ with near optimality dimension $v_i$ based on HOO is:

$$r_{q_i}^{\mathcal{C}^{(i)}}(\Delta) \le O\left(\frac{1}{q_i^{\frac{1}{v_i+2}}}\right),$$

where $$v_i \le \frac{d}{\beta}.$$

If the overall query budget q is divided across the $\pi \le m_0 m_1$ non-empty partitions equally, then the bound will be scaled by $$\pi^{\frac{1}{v_i+2}}$$

when expressed as a function of q. Moreover, the regret for the entire $\mathcal{C}$ can then be bounded by the maximum regret across these partitions leading to the following result:

$$r_q^{\mathcal{C}}(\Delta) \le O\left(\left(\frac{\pi}{q}\right)^{\frac{\beta}{d+2\beta}}\right) \qquad (14)$$

It should be appreciated that for a model to be interpretable, $m_0$ and $m_1$ are likely to be small (e.g., shallow trees, small rule lists or linear models where m=1) leading to a small $\pi$ and v can be $$\gg \frac{d}{\beta}$$

in the case where $f$ and $f_0$ are both black box. Hence, interpretability significantly reduces the regret in estimating the maximum deviation.

If one of $f$ and $f_0$ is black box and the other is interpretable, making no further assumptions on the black box model and assuming $\Delta$ satisfies properties discussed above when both $f$ and $f_0$ are black box, the simple regret has the same behavior as Eq. (13). This is expected as the black box model could be highly non-smooth.

Analysis component 112 can determine sufficiency of the supervised learning model based at least in part on the maximum deviation as described above. In an embodiment, analysis component 112 can determine if deviation of the supervised learning model from the reference model over the certification set exceeds a threshold value. For example, analysis component 112 can receive the maximum deviation as measured by measurement component 108. Analysis component 112 can also receive a threshold value to compare the maximum deviation to. For example, analysis component 112 can retrieve a threshold value stored in memory 114. In another example, an entity can select a threshold value using input device(s) 106 and/or communications component 110. Analysis component 112 can then compare the maximum deviation to the threshold value. If the maximum deviation exceeds the threshold, then the supervised learning model's performance is not sufficient. Similarly, if the maximum deviation does not exceed the threshold, then the supervised learning model's performance is sufficient. In an embodiment, analysis component 112 can output a notification of the sufficiency of the supervised learning model to an entity via input device(s) 106 and/or communications component 110.

In another embodiment, analysis component 112 can determine sufficiency of the supervised learning model based at least in part on multiple deviations over multiple certification sets. For example, as described above, measurement component 108 can measure multiple deviations over multiple certifications sets and/or multiple subsets of the certification set. Accordingly, analysis component 112 can receive a first deviation over a first certification set, a second deviation over a second certification set and a third deviation over a third deviation set. In an embodiment, analysis component 112 can compare the first deviation, the second deviation and the third deviation to the threshold value. For example, if the first deviation, the second deviation and the third deviation are all less than the threshold value, then performance of the supervised machine learning model is sufficient. In another embodiment, an entity may specify, via input device(s) 106 and/or communications component 110 a number of deviations that are less than the threshold for performance of the supervised learning model to be sufficient. For example, an entity may specify that two of the three deviations be less than the threshold for performance to be sufficient. In a further embodiment, an entity may specify that specific deviations be less than the threshold for performance to be sufficient. For example, an entity may specify that the first deviation and the third deviation be less than the threshold for performance to be sufficient.

In an additional embodiment, analysis component 112 can compare multiple deviations to multiple thresholds. For example, analysis component 112 can receive a first threshold value, a second threshold value and a third threshold value. Analysis component 112 can then compare the first deviation to the first threshold, the second deviation to the second threshold and the third deviation to the third threshold. As described above, an entity can specify that all deviations be below the corresponding threshold, that a specific number of deviations be below the corresponding threshold, or that specific deviations be below the corresponding threshold for the supervised learning model's performance to be sufficient. It should be appreciated that while examples are described with reference to three deviations and three thresholds, use of any number of deviations, certification sets or subsets, and/or threshold values is envisioned.

In an additional embodiment, analysis component 112 can compare an average deviation to a threshold value. For example, given three deviations over three certification sets, analysis component 112 can determine an average deviation of the three deviations and compare the average deviation to a threshold value. If the average deviation exceeds the threshold, then the supervised learning model's performance is not sufficient. Similarly, if the average deviation does not exceed the threshold, then the supervised learning model's performance is sufficient. In an embodiment, analysis component 112 can output a notification of the sufficiency or lack of sufficiency of the supervised learning model to an entity via input device(s) 106 and/or communications component 110.

Figure 2:
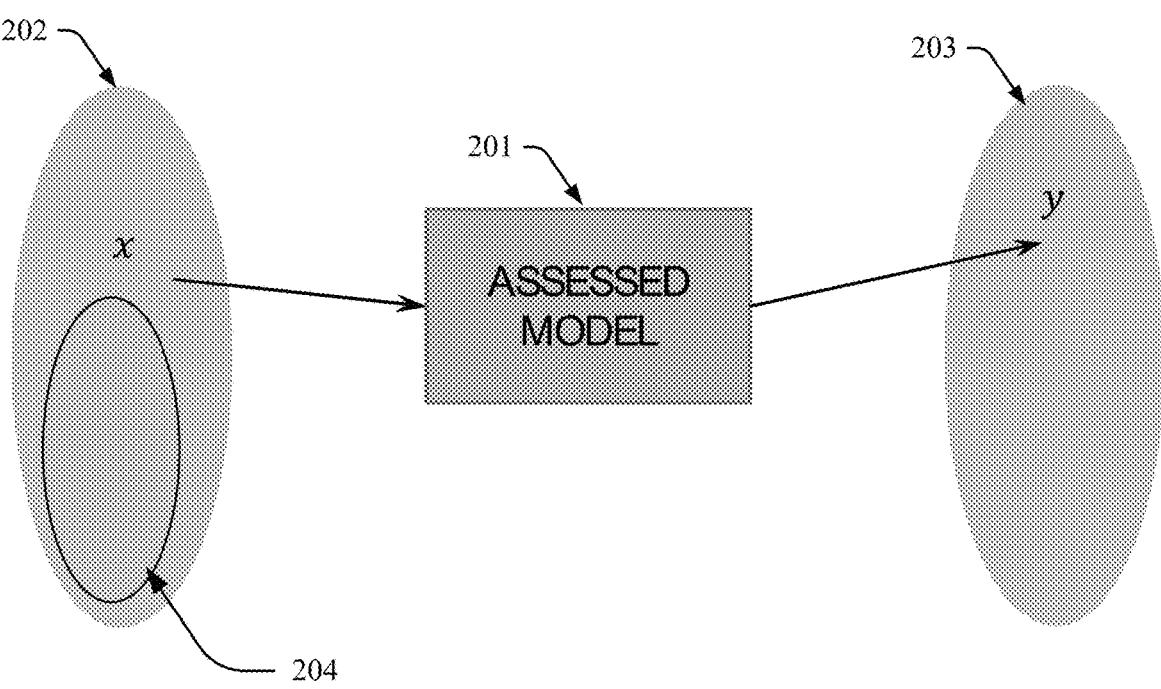
FIG. 2 illustrates a flow diagram of an example, non-limiting system that can map members of an input space to an output space in accordance with one or more embodiments described herein.

FIG. 2 illustrates a block diagram of an example, non-limiting system 200 that can map members of an input space to an output space in accordance with one or more embodiments described herein.

As shown, system 200 can comprise a supervised learning model 201 to be assessed for sufficiency. Supervised learning model 201 can receive an input from input space 202 and map the input to an output within output space 203. In an embodiment, supervised learning model 201 can be trained using training set 204 that is a subset of input space 202. Accordingly, supervised learning model 201 will likely perform sufficiently when given an input that is within or close to (e.g., within a deviation of) the training set 204. However, when given an output from outside training set 204, supervised learning model 201 may generate an unexpected output due to the lack of similar data in training set 204. For example, given input x, that is outside of training set 204, supervised learning model 201 may generate an output y that is unexpected and/or incorrect, due to the insufficiency of the training of supervised learning model 201.

Figure 3:
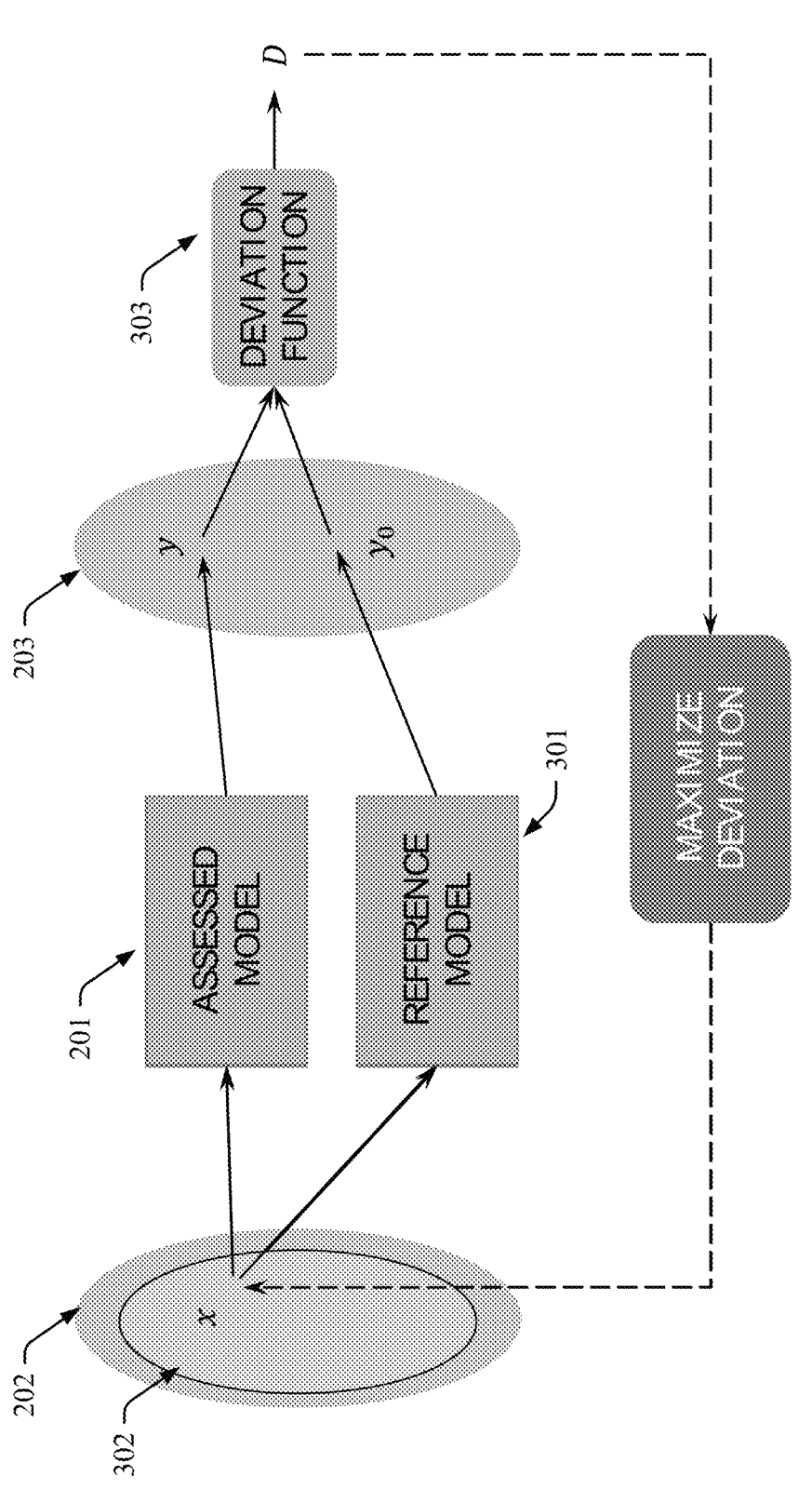
FIG. 3 illustrates a flow diagram of an example, non-limiting system that can assess the sufficiency of one or more machine learning models in accordance with one or more embodiments described herein.

FIG. 3 illustrates a block diagram of an example, non-limiting system 300 that can assess the sufficiency of one or more machine learning models in accordance with one or more embodiments described herein. Repetitive description of like elements employed in other embodiments described herein is omitted for sake of brevity As shown, system 300 can comprise supervised learning model 201 to be assessed for sufficiency and reference model 301. In an embodiment, reference model 301 can be a machine learning model that is deemed to perform sufficiently. For example, as described above in reference to FIG. 1, reference model 301 can be a model that was previously extensively trained and/or previously deployed and known to perform within specific parameters. In one or more embodiments, reference model 301 can be deemed to perform sufficiently over a certification set 302, wherein the certification set 302 is a subset of input space 202 and includes substantially all conceivable inputs of input space 202. Supervised learning model 201 and reference model 301 can receive as an input x, wherein x is within the certification set 302. In an embodiment, measurement component 108 can sample input x from the certification set 302 Supervised learning model 201 and reference model 301 can then generate outputs y and $y_0$ respectively. Measurement component 108 can then utilize deviation function 303 to determine a deviation between the outputs of supervised learning model 201 and reference model 301. As described above in reference to FIG. 1, deviation function 303 can comprise different deviation functions depending on the type of model of supervised learning model 201. As described above in reference to FIG. 1, analysis component 112 can determine if the deviation of supervised learning model 201 from reference model 301 exceeds a threshold value and can identify a set of inputs that produce deviation greater than the threshold.

Figure 4:
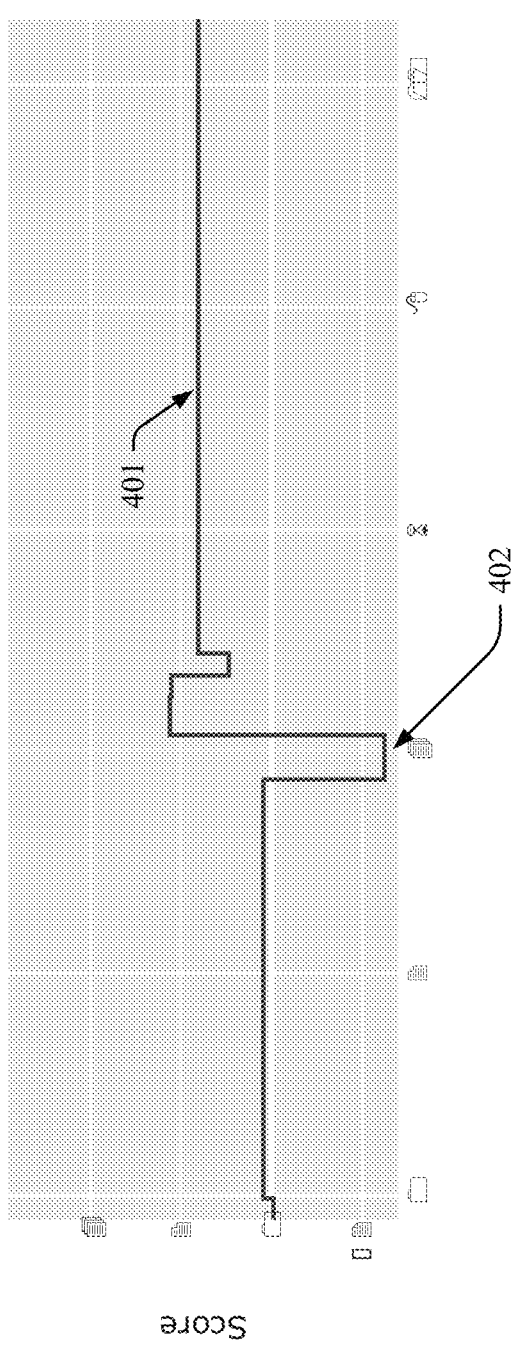
FIG. 4 illustrates a graph representing a shape function of capital loss in accordance with one or more embodiments described herein.

FIG. 4 illustrates a graph 400 representing a shape function of capital loss in accordance with one or more embodiments described herein.

In graph 400, the reference model is a decision tree and the supervised learning model is a GAM. In the data set used, the capital loss feature is the largest contributor to the maximum deviation. The shape function 401 shows a low region 402, which is unexpected. Accordingly, this low region may be an artifact warranting further investigation since it seems anomalous compared to the rest of the function. In an embodiment, analysis component 112 can send a warning to a user identifying low region 402 based on shape function 401, to alert the user to the possibility of the artifact.

Figure 5B:
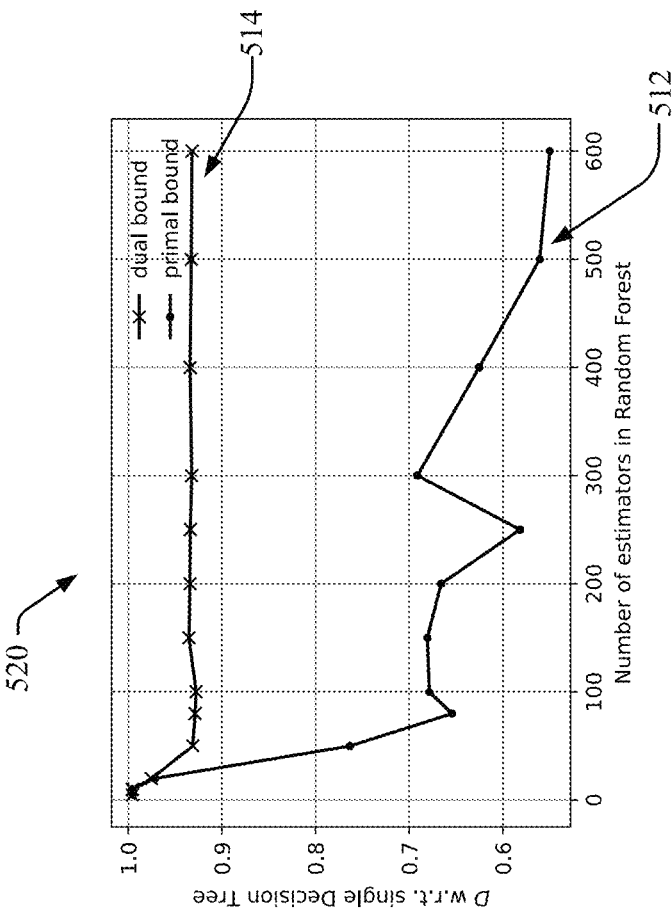
FIGS. 5A and 5B illustrate graphs representing the maximum deviation between a reference model and a supervised learning model in accordance with one or more embodiments described herein.
Figure 5A:
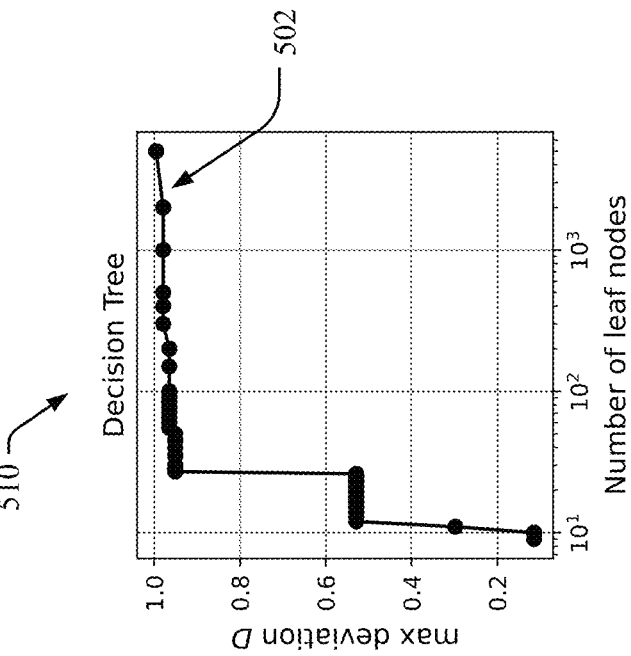

FIG. 5A illustrates a graph 510 representing the maximum deviation between a decision tree reference model and a decision tree supervised learning model.

The y-axis of graph 510 represents the maximum deviation between the reference model and the supervised learning model, as determined by measurement component 108 as describe above in reference to FIG. 1. The x-axis of graph 510 represents the number of leaf nodes within the supervised learning model. Accordingly, line 502 illustrates the maximum deviation at various number of leaf nodes. As shown, as model complexity (e.g., number of leaf nodes) increases, the maximum deviation can increase.

FIG. 5B illustrates a graph 520 representing the maximum deviation between a decision tree reference model and a Random Forest supervised learning model in accordance with one or more embodiments described herein.

The y-axis of graph 520 represents the maximum deviation between the reference model and the supervised learning model, as determined by measurement component 108 as described above in reference to FIG. 1. The x-axis of graph 520 represents the number of estimators within the supervised learning model. Accordingly, line 512 illustrates the primal bound of the maximum deviation at various number of estimators, as described above in reference to FIG. 1. Line 514 illustrates the dual bound of the maximum deviation at various numbers of estimators, as described above in reference to FIG. 1. As shown, as model complexity (e.g., number of estimators) increases, the maximum deviation can decrease, likely due to the increased averaging of the estimators, making the supervised learning model smoother.

Figure 6:
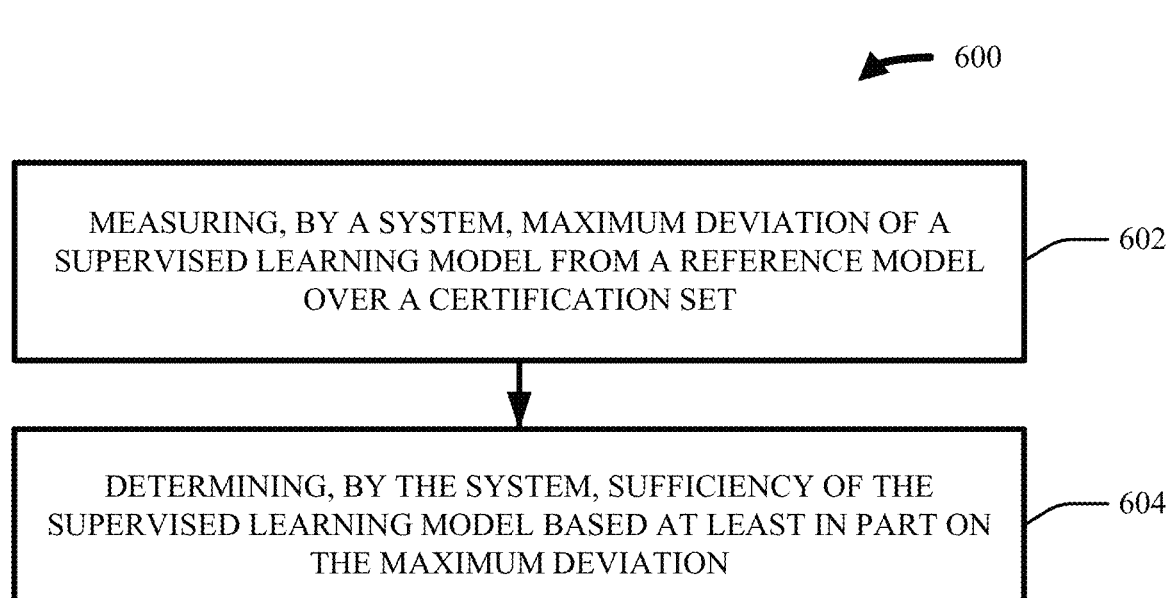
FIG. 6 illustrates a flow diagram of an example, non-limiting computer-implemented method that can facilitate assessment of the sufficiency of one or more machine learning models in accordance with one or more embodiments described herein.

FIG. 6 illustrates a flow diagram of an example, non-limiting computer-implemented method 600 that can facilitate assessment of the sufficiency of one or more machine learning models in accordance with one or more embodiments described herein. Repetitive description of like elements employed in other embodiments described herein is omitted for sake of brevity.

At 602, method 600 can comprise measuring, by a system (e.g., system 100 and/or measurement component 108) operatively coupled to a processor (e.g., processor 118), maximum deviation of a supervised learning model from a reference model over a certification set. For example, as described above in reference to FIGS. 1-3, measurement component 108 can sample various outputs from the reference model and the supervised learning model based on inputs from a certification set. Based on the type of reference model and supervised learning model, measurement component 108 can then determine the output with the maximum deviation between the reference model and the supervised learning model as described in FIGS. 1 and 3.

At 604, method 600 can comprise determining, by the system (e.g., system 100 and/or analysis component 112), sufficiency of the supervised learning model based at least in part on the maximum deviation.

FIG. 7 illustrates a flow diagram of an example, non-limiting computer-implemented method that can facilitate assessment of the sufficiency of one or more machine learning models in accordance with one or more embodiments described herein. Repetitive description of like elements employed in other embodiments described herein is omitted for sake of brevity. At 702, method 700 can comprise measuring, by a system (e.g., system 100 and/or measurement component 108) operatively coupled to a processor (e.g., processor 118), maximum deviation of a supervised learning model from a reference model over a certification set. At 704, method 700 can comprise determining, by the system (e.g., system 100 and/or analysis component 112), if deviation of the supervised learning model from the reference model over the certification set exceeds a threshold value. For example, as described above in reference to FIG. 1, analysis component 112 can compare the maximum deviation to a threshold value. In another example, analysis component 112 can compare multiple maximum deviations from multiple certification sets or certification subsets to multiple threshold values.

At 706, method 700 can comprise outputting, by the system, (e.g., system 100, analysis component 112 and/or input device(s) 106), a notification of sufficiency of performance of the supervised learning model. For example, in response to determining that the deviation is less than the threshold value at step 704, the performance of the supervised learning model can be determined to be sufficient, and a notification of the sufficiency of the supervised learning model can be output. At 708, method 700 can comprise, outputting, by the system, (e.g., system 100, analysis component 112 and/or input device(s) 106), a notification of the lack of sufficiency of performance of the supervised learning model. For example, in response to determining that the deviation exceeds the threshold value at step 704, the performance of the supervised learning model can be determined to be insufficient, and a notification of the lack of sufficiency of the supervised learning model can be output. In an embodiment, the notification can comprise a value indicating by how much the deviation exceeded the threshold value.

FIG. 8 illustrates a flow diagram of an example, non-limiting computer-implemented method that can facilitate assessment of the sufficiency of one or more machine learning models in accordance with one or more embodiments described herein. Repetitive description of like elements employed in other embodiments described herein is omitted for sake of brevity. At 802, method 800 can comprise measuring, by a system (e.g., system 100 and/or measurement component 108) operatively coupled to a processor (e.g., processor 118), maximum deviation of a supervised learning model from a reference model over a certification set. At 804, method 800 can comprise determining, by the system (e.g., system 100 and/or analysis component 112), if deviation of the supervised learning model from the reference model over the certification set exceeds a threshold value. At 806, method 800 can comprise outputting, by the system, (e.g., system 100, analysis component 112 and/or input device(s) 106), a notification of sufficiency of performance of the supervised learning model. For example, in response to determining that the deviation is less than the threshold value at step 804, the performance of the supervised learning model can be determined to be sufficient, and a notification of the sufficiency of the supervised learning model can be output.

At 808, method 800 can comprise identifying, by the system (e.g., system 100 and/or analysis component 112), a set of inputs with deviation greater than the threshold. For example, measurement component 108 can output a set of data points comprising input values and the corresponding deviation between the reference model and the supervised learning model. Analysis component 112 can then output a list to an entity comprising one or more inputs which generated a deviation greater than a threshold. In a further embodiment, the list of one or more inputs can be utilized as a training set to update the training of the supervised machine learning model.

At 810, method 800 can comprise outputting, by the system, (e.g., system 100, analysis component 112 and/or input device(s) 106), a notification of the lack of sufficiency of performance of the supervised learning model. For example, in response to determining that the deviation exceeds the threshold value at step 804, the performance of the supervised learning model can be determined to be insufficient, and a notification of the lack of sufficiency of the supervised learning model can be output. In an embodiment, the notification can comprise a value indicating by how much the deviation exceeded the threshold value. In a further embodiment, the notification can further comprise the list to an entity comprising one or more inputs which generated a deviation greater than a threshold, as generated at step 808.

The computer processing systems, computer-implemented methods, apparatus and/or computer program products employ hardware and/or software to solve problems that are highly technical in nature (e.g., determining sufficient performance of machine learning models), that are not abstract and cannot be performed as a set of mental acts by a human. For example, an individual, or even multiple individuals, cannot readily sample a machine learning model at a vast amount of input settings to generate one or more outputs to determine deviations between a supervised learning model and a reference model. For instance, an individual cannot generate one or more outputs in virtual space from which sufficiency of performance of a machine learning model can be determined. Various embodiments described herein can constitute a technical improvement over conventional machine learning assessment systems by enabling comparison between outputs of a supervised learning model and a reference model on the same inputs. Additionally, one or more embodiments described herein can demonstrate a practical application in assessing the performance of machine learning models to prevent the deployment of machine learning models that may output unexpected outcomes.

As used herein, the term "machine learning" can refer to an application of AI technologies to automatically and/or autonomously learn and/or improve from an experience (e.g., learning data) without explicit programming of the lesson learned and/or improved. For example, machine learning tasks can utilize one or more algorithms to facilitate supervised learning to perform tasks such as classification and/or regression.

As used herein, the terms "machine learning model" and/or "machine learning models" can refer to a computer model that can be used to facilitate one or more machine learning tasks, wherein the computer model can simulate a number of interconnected processing units that can resemble abstract versions of neurons. For example, the one or more machine learning models can be neural network models comprising processing units that can be arranged in a plurality of layers (e.g., one or more input layers, one or more hidden layers, and/or one or more output layers) connected with by varying connection strengths (e.g., which can be commonly referred to within the art as "weights"). Neural network models can learn through learning, wherein data with known outcomes is inputted into the computer model, outputs regarding the data are compared to the known outcomes, and/or the weights of the computer model are autonomous adjusted based on the comparison to replicate the known outcomes. As used herein, the term "learning data" can refer to data and/or data sets used to train one or more machine learning models. As a machine learning model trains (e.g., utilizes more learning data), the computer model can become increasingly accurate; thus, trained machine learning models can accurately analyze data with unknown outcomes, based on lessons learning from learning data, to facilitate one or more machine learning tasks. Example machine learning models can include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), neural turing machine ("NTM"), a combination thereof, and/or the like.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as machine learning sufficiency code block 950. In addition to block 950, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 950, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 950 in persistent storage 913.

COMMUNICATION FABRIC 911 is the signal conduction paths that allow the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface type operating systems that employ a kernel. The code included in block 950 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

Figure 10:
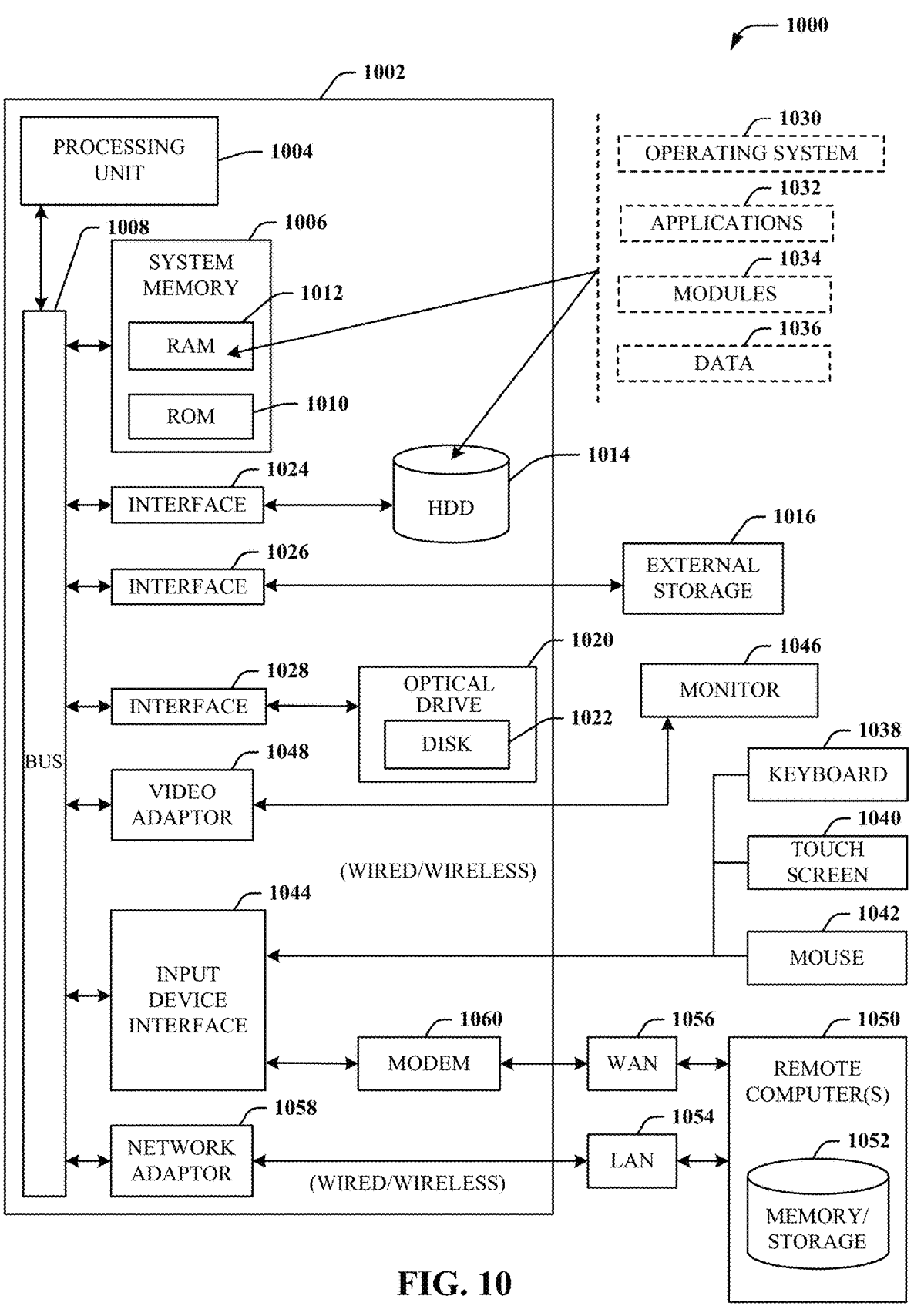
FIG. 10 illustrates a block diagram of an example, non-limiting operating environment in which one or more embodiments described herein can be facilitated.

In order to provide additional context for various embodiments described herein, FIG. 10 and the following discussion are intended to provide a general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system ("BIOS") can be stored in a non-volatile memory such as ROM, erasable programmable read only memory ("EPROM"), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive ("HDD") 1014 (e.g., EIDE, SATA), one or more external storage devices 1016 (e.g., a magnetic floppy disk drive ("FDD") 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive ("SSD") could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine ("VM") of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module ("TPM"). For instance, with a TPM, boot components hash next in time boot components, and wait for a match of results to secured values, before loading a next boot component. This process can take place at any layer in the code execution stack of computer 1002, e.g., applied at the application execution level or at the operating system ("OS") kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network ("LAN") 1054 and/or larger networks, e.g., a wide area network ("WAN") 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point ("AP") disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory that stores computer executable components including a certification set of machine-readable inputs defining a bounded region of an input feature space over which model behavior is evaluated; and a processor, operably coupled to the memory, and that executes the computer executable components stored in the memory, wherein the computer executable components comprise:

a measurement component that computationally evaluates, using the stored certification set, a maximum deviation of a supervised learning model from a reference model by exhaustively evaluating and provably bounding deviations over the certification set rather than by sampling or empirical validation;

wherein the supervised learning model comprises a tree ensemble, and the measurement component employs one or more discrete optimization techniques to exploit composition in terms of trees to provide anytime bounds on the maximum deviation;

wherein the measurement component constructs a representation of leaf regions of the tree ensemble, identifies candidate combinations of leaves drawn from respective trees whose feature-space regions are mutually compatible, computes a deviation associated with each candidate combination, and uses bounding techniques to prune candidate combinations to determine the maximum deviation; and an analysis component that determines sufficiency of the supervised learning model based at least in part on the maximum deviation satisfying a predefined certification criterion, and that outputs a machine-readable sufficiency notification that automatically governs retraining of the supervised learning model within a computing environment, and wherein the system thereby provides a pre-deployment computational certification of model reliability that is independent of training accuracy or test-set performance;

wherein the system automatically controls deployment of the model into a computing environment as a function of the certification.

2. The system of claim 1, wherein the certification set is a subset of an input space of the supervised learning model.

3. The system of claim 1, wherein for a bipartite graph, with z nodes representing leaves $\mathcal{L}_l$ of/on one side and $L_G$ nodes representing leaves $\mathcal{L}_{Om}$ of $f_O$ on the other, the measurement component defines an edge set $\varepsilon=\{(l, m): \mathcal{L}_l \cap \mathcal{L}_{Om} \cap \mathcal{C} \neq \varnothing\}$; where $|\varepsilon| \leq L_O L$, where $f$ and $f_O$ are decision trees with $L$ and $L_O$ leaves respectively, and $\varepsilon$ is a bipartite edge set of leaf intersections, the maximum deviation can be computed with $|\varepsilon|$ evaluations as $$\max_{x \in C} D(f(x), f_0(x)) = \max_{(l,m) \in \mathcal{E}} D(y_l, y_{0m}).$$

4. The system of claim 1, wherein the analysis component identifies inputs that lead to a deviation greater than a threshold value.

5. The system of claim 1, wherein the analysis component for the supervised learning model $f$, which is a function mapping an input feature space $\mathcal{X}$ to an output space $\mathcal{Y}$, determines sufficiency of the supervised learning model by determining its worst-case deviation from the reference model $f_0 \colon \mathcal{X} \mapsto \mathcal{Y}$ wherein for a measure of deviation D: $\mathcal{Y} \times \mathcal{Y} \mapsto \mathbb{R}_+$, where $\mathbb{R}_+$ is the set of non-negative reals, and the certification set $\mathcal{C} \subseteq \mathcal{X}$ over which the deviation is maximized, the analysis solves:

$$\max_{x \in C} D(f(x), f_0(x)).$$

6. The system of claim 1, wherein the analysis component determines if deviation of the supervised learning model from the reference model over the certification set exceeds a threshold value, and identifies a set of inputs with deviation greater than the threshold value.

7. A computer-implemented method, comprising:
measuring, by a processor, a maximum deviation metric of a supervised learning model from a reference model by exhaustively evaluating and provably bounding deviations over a certification set of machine-readable inputs stored in memory, the certification set defining a bounded subset of an input feature space over which model behavior is evaluated;
wherein the supervised learning model comprises a tree ensemble, and the measurement component employs one or more discrete optimization techniques to exploit composition in terms of trees to provide anytime bounds on the maximum deviation;
wherein the measurement component constructs a representation of leaf regions of the tree ensemble, identifies candidate combinations of leaves drawn from respective trees whose feature-space regions are mutually compatible, computes a deviation associated with each candidate combination, and uses bounding techniques to prune candidate combinations to determine the maximum deviation; and
using the processor to determine sufficiency of the supervised learning model based at least in part on whether the maximum deviation metric satisfies a predefined certification criterion, and generating, by the processor, a machine-readable sufficiency notification that is consumed by an automated control process to selectively initiate retraining of the supervised learning model within a computing environment;
wherein the method provides a pre-deployment computational certification of model reliability independently of training loss, validation accuracy, or empirical test-set performance of the supervised learning model;
wherein the system automatically controls deployment of the model into a computing environment as a function of the certification.

8. The computer-implemented method of claim 7, wherein the certification set is a subset of an input space of the supervised learning model.

9. The computer-implemented method of claim 7, wherein for a bipartite graph, with L nodes representing leaves $\mathcal{L}_l$ of $f$ on one side and $L_0$ nodes representing leaves $\mathcal{L}_{0m}$ of $f_0$ on the other, the processor defines an edge set $\mathcal{E} = \{(l,m) \colon \mathcal{L}_l \cap \mathcal{L}_{0m} \cap \mathcal{C} \neq \emptyset\}$; where $|\mathcal{E}| \leq L_0 L$, where $f$ and $f_0$ are decision trees with L and $L_0$ leaves respectively, and $\mathcal{E}$ is a bipartite edge set of leaf intersections, computes the maximum deviation with $|\mathcal{E}|$ evaluations as $$\max_{x \in C} D(f(x), f_0(x)) = \max_{(l,m) \in \mathcal{E}} D(y_l, y_{0m}).$$

10. The computer-implemented method of claim 7, further comprising:
identifying inputs that lead to deviation greater than a threshold.

11. The computer-implemented method of claim 7, wherein the processor for the supervised learning model $f$, which is a function mapping an input feature space $\mathcal{X}$ to an output space $\mathcal{Y}$, determines sufficiency of the supervised learning model by determining its worst-case deviation from the reference model $f_0 \colon \mathcal{X} \mapsto \mathcal{Y}$ wherein for a measure of deviation D: $\mathcal{Y} \times \mathcal{Y} \mapsto \mathbb{R}_+$ where $\mathbb{R}_+$ is the set of non-negative reals, and the certification set $\mathcal{C} \subseteq \mathcal{X}$ over which the deviation is maximized, the analysis solves:

$$\max_{x \in C} D(f(x), f_0(x)).$$

12. The computer-implemented method of claim 7, wherein the processor determines if deviation of the supervised learning model from the reference model over the certification set exceeds a threshold value, and identifies a set of inputs with deviation greater than the threshold value.

13. A non-transitory computer program product for determining sufficiency of a supervised learning model, the computer program product comprising a computer readable storage medium having program instructions embodied therewith, the program instructions executable by a processor to cause the processor to:
measure a maximum deviation metric of the supervised learning model from a reference model by exhaustively evaluating and provably bounding deviations over a certification set of machine-readable inputs stored in memory, the certification set corresponding to a bounded subset of an input feature space over which model behavior is evaluated;
wherein the supervised learning model comprises a tree ensemble, and the measurement component employs one or more discrete optimization techniques to exploit composition in terms of trees to provide anytime bounds on the maximum deviation;
wherein the measurement component constructs a representation of leaf regions of the tree ensemble, identifies candidate combinations of leaves drawn from respective trees whose feature-space regions are mutually compatible, computes a deviation associated with each candidate combination, and uses bounding techniques to prune candidate combinations to determine the maximum deviation; and
determine sufficiency of the supervised learning model based at least in part on whether the maximum deviation metric satisfies a predefined certification criterion, and generate a machine-readable sufficiency notification configured to be consumed by an automated model-governance process to selectively trigger retraining of the supervised learning model within a computing environment;

wherein the program instructions implement a pre-deployment computational certification of model reliability independently of training loss, validation accuracy, or empirical test-set performance of the supervised learning model;

wherein the system automatically controls deployment of the model into a computing environment as a function of the certification.

14. The computer program product of claim 13, wherein the certification set is a subset of an input space of the supervised learning model.

15. The computer program product of claim 13, wherein the program instructions further cause the processor to for a bipartite graph, with L nodes representing leaves $L_l$ of $f$ on one side and $L_0$ nodes representing leaves $\mathcal{L}_{0m}$ of $f_0$ on the other, define an edge set $\varepsilon=\{(l,m): \mathcal{L} \cap \mathcal{L}_{0m} \cap \mathcal{C} \neq \emptyset\}$; where $[\varepsilon] \leq L_0 L$, where $f$ and $f_0$ are decision trees with L and $L_0$ leaves respectively, and $\varepsilon$ is a bipartite edge set of leaf intersections, and compute the maximum deviation with $[\varepsilon]$ evaluations as $$\max_{x \in C} D(f(x), f_0(x)) = \max_{(l,m) \in \mathcal{E}} D(y_l, y_{0m}).$$

16. The computer program product of claim 13, wherein the program instructions further cause the processor to identify inputs that lead to a deviation greater than a threshold value.

17. The computer program product of claim 13, wherein the program instructions further cause the processor to for the supervised learning model $f$, which is a function mapping an input feature space $\mathcal{X}$ to an output space $\mathcal{Y}$, determine sufficiency of the supervised learning model by determining its worst-case deviation from the reference model $f_0: \mathcal{X} \mapsto \mathcal{Y}$ wherein for a measure of deviation D: $\mathcal{Y} \times \mathcal{Y} \mapsto \mathbb{R}_+$ where $\mathbb{R}_+$ is the set of non-negative reals, and the certification set $\mathcal{C} \subseteq \mathcal{X}$ over which the deviation is maximized, the analysis solves:

$$\max_{x \in C} D(f(x), f_0(x)).$$

18. The computer program product of claim 13, wherein the program instructions further cause the processor to determine if deviation of the supervised learning model from the reference model over the certification set exceeds a threshold value, and identifies a set of inputs with deviation greater than the threshold value.

\* \* \* \* \*